(12) United States Patent
Ravikumar et al.

(10) Patent No.: US 9,856,141 B2
(45) Date of Patent: Jan. 2, 2018

(54) METHOD FOR AVOIDING EXPENSIVE SOUR WATER STRIPPER METALLURGY IN A GASIFICATION PLANT

(71) Applicant: Fluor Technologies Corporation, Sugar Land, TX (US)

(72) Inventors: Ravi Ravikumar, Lancaster, CA (US); Patrick Goodman, Trabuco Canyon, CA (US); Sanjiv Dabee, Aliso Viejo, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 14/990,646

(22) Filed: Jan. 7, 2016

(65) Prior Publication Data

US 2017/0197827 A1    Jul. 13, 2017

(51) Int. Cl.
*C01B 3/16*    (2006.01)
*C01B 3/52*    (2006.01)
(Continued)

(52) U.S. Cl.
CPC ............. *C01B 3/16* (2013.01); *C01B 3/52* (2013.01); *C10J 3/82* (2013.01); *C10K 1/101* (2013.01); *C10K 3/04* (2013.01); *C01B 2203/0283* (2013.01); *C01B 2203/0415* (2013.01); *C01B 2203/0465* (2013.01); *C01B 2203/062* (2013.01); *C01B 2203/0883* (2013.01); *C01B 2203/147* (2013.01); *C10J 2300/093* (2013.01);
(Continued)

(58) Field of Classification Search
CPC ....................................................... C01B 3/16
See application file for complete search history.

(56) References Cited

U.S. PATENT DOCUMENTS 4,208,384 A * 6/1980 Mitchell .............. B01D 53/523
                                                              423/220
5,415,673 A    5/1995 Hilton et al.
(Continued)

FOREIGN PATENT DOCUMENTS

GB    2002809    * 2/1979

OTHER PUBLICATIONS

PCT Application No. PCT/US2016/013705, International Search Report and Written Opinion, dated Aug. 24, 2016, 10 pages.

*Primary Examiner* — Douglas B Call
(74) *Attorney, Agent, or Firm* — Conley Rose, P.C.

(57) ABSTRACT

A method of producing syngas comprising receiving raw syngas from a gasification unit; introducing the raw syngas and water to a syngas scrubber to produce unshifted syngas; introducing a first portion of unshifted syngas to a first cooling unit to produce cooled unshifted syngas and a first aqueous condensate comprising cyanide in an amount of 5-200 ppmw; recycling the first aqueous condensate to the syngas scrubber; introducing a second portion of unshifted syngas to a water gas shift unit to produce shifted syngas; introducing the shifted syngas to a second cooling unit to produce cooled shifted syngas and a second aqueous condensate comprising cyanide in an amount of less than 2.5 ppmw; contacting the cooled shifted syngas with the cooled unshifted syngas to produce modified syngas; and introducing the second aqueous condensate to a sour water stripper to produce stripped water and an acid gas comprising $H_2S$, $CO_2$, and ammonia.

25 Claims, 1 Drawing Sheet

(51) Int. Cl.
*C10J 3/82* (2006.01)
*C10K 1/10* (2006.01)
*C10K 3/04* (2006.01)

(52) U.S. Cl.
CPC ............... *C10J 2300/0916* (2013.01); *C10J 2300/0943* (2013.01); *C10J 2300/1618* (2013.01)

(56) References Cited

U.S. PATENT DOCUMENTS

| | | | |
|---|---|---|---|
| 2007/0129450 A1* | 6/2007 | Barnicki | C10G 2/30 518/704 |
| 2007/0284108 A1* | 12/2007 | Roes | E21B 36/04 166/302 |
| 2010/0065782 A1 | 3/2010 | Dierickx et al. | |
| 2011/0042327 A1* | 2/2011 | Miller | C02F 9/00 210/748.13 |
| 2012/0094337 A1* | 4/2012 | Van Den Born | B01D 53/1425 435/132 |
| 2012/0198768 A1 | 8/2012 | Khosravian et al. | |
| 2014/0117287 A1* | 5/2014 | Ariyapadi | B01J 7/00 252/373 |
| 2015/0184093 A1 | 7/2015 | Hickey et al. | |

\* cited by examiner

METHOD FOR AVOIDING EXPENSIVE SOUR WATER STRIPPER METALLURGY IN A GASIFICATION PLANT

TECHNICAL FIELD

The present disclosure relates to methods of producing synthesis gas, more specifically methods of producing synthesis gas from feedstocks containing nitrogen.

BACKGROUND

Synthesis gas (syngas) is a mixture comprising of carbon monoxide and hydrogen, and some carbon dioxide. Syngas is widely used in industrial settings, either for electricity generation or as an intermediate in the production of synthetic natural gas (SNG), hydrogen, ammonia, methanol, and liquid hydrocarbons, for example via a Fischer-Tropsch process. Syngas is generally produced by gasification of a carbon containing fuel, such as natural gas, coal, biomass, coke (e.g., petroleum coke) or virtually any hydrocarbon feedstock. However, when the carbon containing fuel also contains nitrogen, the produced syngas will contain cyanide, which is corrosive and requires the use of safety precautions and special expensive alloys. Thus, there is an ongoing need for the development of methods for producing syngas from feedstocks containing nitrogen, in order to minimize the need for processing waste streams containing cyanide.

BRIEF SUMMARY

Disclosed herein is a method of producing synthesis gas (syngas) comprising (a) receiving raw syngas from a gasification unit, (b) introducing at least a portion of the raw syngas and water to a syngas scrubber to produce unshifted syngas, (c) introducing a first portion of the unshifted syngas to a first cooling unit to produce a cooled unshifted syngas and a first aqueous condensate, wherein the first aqueous condensate comprises cyanide in an amount of from about 5 parts per million by weight (ppmw) to about 200 ppmw, (d) recycling at least a portion of the first aqueous condensate to the syngas scrubber, (e) introducing a second portion of the unshifted syngas to a water gas shift unit to produce a shifted syngas, wherein a molar ratio of hydrogen to carbon monoxide in the shifted syngas is greater than a molar ratio of hydrogen to carbon monoxide in the unshifted syngas, (f) introducing at least a portion of the shifted syngas to a second cooling unit to produce a cooled shifted syngas and a second aqueous condensate, wherein the second aqueous condensate comprises cyanide in an amount of less than about 2.5 ppmw, (g) contacting at least a portion of the cooled shifted syngas with at least a portion of the cooled unshifted syngas to produce a modified syngas, wherein a molar ratio of hydrogen to carbon monoxide in the modified syngas is greater than a molar ratio of hydrogen to carbon monoxide in the unshifted syngas, and wherein the molar ratio of hydrogen to carbon monoxide in the modified syngas is lower than a molar ratio of hydrogen to carbon monoxide in the shifted syngas, and (h) introducing at least a portion of the second aqueous condensate to a sour water stripper to produce an acid gas and stripped water, wherein the acid gas comprises hydrogen sulfide, carbon dioxide, and ammonia.

Also disclosed herein is a method of producing synthesis gas (syngas) comprising (a) converting a carbon containing fuel to raw syngas in a gasification unit, wherein the carbon containing fuel comprises nitrogen in an amount of equal to or greater than about 0.5 wt. %, and wherein the raw syngas comprises carbon monoxide, hydrogen, and solid particulates, (b) introducing at least a portion of the raw syngas and water to a syngas scrubber to remove at least a portion of the solid particulates from the raw syngas to produce unshifted syngas, and wherein a molar ratio of hydrogen to carbon monoxide in the raw syngas is about the same as a molar ratio of hydrogen to carbon monoxide in the unshifted syngas, (c) introducing a first portion of the unshifted syngas to a first cooling unit to produce a cooled unshifted syngas and a first aqueous condensate, wherein the first aqueous condensate comprises cyanide in an amount of from about 20 ppmw to about 100 ppmw, (d) recycling at least a portion of the first aqueous condensate to the syngas scrubber, (e) introducing a second portion of the unshifted syngas to a water gas shift unit to produce a shifted syngas, wherein a molar ratio of hydrogen to carbon monoxide in the shifted syngas is greater than the molar ratio of hydrogen to carbon monoxide in the unshifted syngas, and wherein at least a portion of the cyanide in the second portion of the unshifted syngas is converted to ammonia in the water gas shift unit, (f) introducing at least a portion of the shifted syngas to a second cooling unit to produce a cooled shifted syngas and a second aqueous condensate, wherein the second aqueous condensate comprises cyanide in an amount of less than about 1 ppmw, (g) contacting at least a portion of the cooled shifted syngas with at least a portion of the cooled unshifted syngas to produce modified syngas, wherein a molar ratio of hydrogen to carbon monoxide in the modified syngas is lower than the molar ratio of hydrogen to carbon monoxide in the shifted syngas, wherein the unshifted syngas is characterized by a molar ratio of hydrogen to carbon monoxide of from about 0.5:1 to about 1.25:1, and wherein the modified syngas is characterized by a molar ratio of hydrogen to carbon monoxide of from about 1.7:1 to about 3.2:1, (h) introducing at least a portion of the second aqueous condensate to a sour water stripper to produce an acid gas and stripped water, wherein the acid gas comprises hydrogen sulfide, carbon dioxide, and ammonia, and wherein the sour water stripper and associated piping and equipment are fabricated from materials comprising carbon steel, (i) communicating a pump-around stream from the sour water stripper to a third cooling unit to produce a cooled pump-around stream, wherein at least a portion of the cooled pump-around stream is recycled to the sour water stripper, wherein the cooled pump-around stream comprises cyanide in an amount of less than about 20 ppmw, wherein the cooled pump-around stream is characterized by a pH of from about 7.5 to about 11, and wherein the third cooling unit and associated piping and equipment are fabricated from materials comprising carbon steel, and (j) introducing at least a portion of the acid gas to a sulfur recovery unit to produce sulfur.

BRIEF DESCRIPTION OF THE DRAWINGS

For a detailed description of the preferred embodiments of the disclosed methods, reference will now be made to the accompanying drawing in which.

DETAILED DESCRIPTION

Disclosed herein are methods of producing synthesis gas (e.g., a modified syngas) comprising (a) receiving a raw syngas from a gasification unit, wherein the raw syngas comprises carbon monoxide, hydrogen, and solid particulates; (b) introducing at least a portion of the raw syngas to a treatment process such as a solid particle remover and/or a water scrubber to produce unshifted syngas, wherein the unshifted syngas comprises carbon monoxide and hydrogen and is substantially free of solid particles; (c) introducing a first portion of the unshifted syngas to a first cooling unit to produce a cooled unshifted syngas and a first aqueous condensate, and wherein the first aqueous condensate comprises cyanide in an amount of from about 5 parts per million by weight (ppmw) to about 200 ppmw; (d) recycling at least a portion of the first aqueous condensate to the syngas scrubber; (e) introducing a second portion of the unshifted syngas to a water gas shift unit to produce a shifted syngas, and wherein a molar ratio of hydrogen to carbon monoxide in the shifted syngas is greater than a molar ratio of hydrogen to carbon monoxide in the unshifted syngas; (f) introducing at least a portion of the shifted syngas to a second cooling unit to produce a cooled shifted syngas and a second aqueous condensate, wherein the second aqueous condensate comprises cyanide in an amount of less than about 2.5 ppmw; (g) contacting at least a portion of the cooled shifted syngas with at least a portion of the cooled unshifted syngas to produce a modified syngas, wherein a molar ratio of hydrogen to carbon monoxide in the modified syngas is greater than a molar ratio of hydrogen to carbon monoxide in the unshifted syngas, and wherein a molar ratio of hydrogen to carbon monoxide in the modified syngas is lower than a molar ratio of hydrogen to carbon monoxide in the shifted syngas; and (h) introducing at least a portion of the second aqueous condensate to a sour water stripper to produce an acid gas and stripped water, wherein the acid gas comprises hydrogen sulfide, carbon dioxide, and ammonia. In an embodiment, the method excludes contacting at least a portion of the first aqueous condensate with at least a portion of the second aqueous condensate.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosed subject matter otherwise claimed. No language in the specification should be construed as indicating any non-claimed element essential to the practice of the disclosed subject matter.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified.

As used herein, the terms "comprise," "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures preceeded by "comprises [ . . . ] a" does not, without more constraints, preclude the existence of other devices or other sub-systems or other elements or other structures or additional devices or additional sub-systems or additional elements or additional structures.

Reference throughout this specification to "one embodiment," "an embodiment," or similar language means that a particular feature, structure, or characteristic described in connection with the embodiment is included in at least one embodiment of the present disclosure. Thus, appearances of the phrase "in one embodiment," "in an embodiment," and similar language throughout this detailed description may, but do not necessarily, all refer to the same embodiment.

The following discussion provides many exemplary embodiments of the disclosed subject matter. Although each embodiment may represent a single combination of disclosed elements, the disclosed subject matter is considered to include all possible combinations of the disclosed elements. Thus, if one embodiment comprises elements A, B, and C, and a second embodiment comprises elements B and D, then the disclosed subject matter is also considered to include other remaining combinations of A, B, C, or D, even if not explicitly disclosed.

In an embodiment, a method of producing synthesis gas (e.g., a syngas product stream suitable for use in a subsequent process, for example a treated syngas stream) can comprise converting a carbon containing fuel to raw syngas in a gasification unit (e.g., gasification of a carbon containing fuel to raw syngas in a gasification unit or gasifier), wherein the raw syngas comprises carbon monoxide, hydrogen, carbon dioxide ($CO_2$), hydrogen sulfide ($H_2S$), carbonyl sulfide (COS), nitrogen ($N_2$), ammonia ($NH_3$) and hydrogen cyanide (HCN), chlorides, and solid particulates.

For purposes of the disclosure herein, the term "carbon containing fuel" or "carbonaceous feedstock" refers to any fuel, feedstock or fuel source that contains carbon. Nonlimiting examples of carbon containing fuels include natural fuels, gas fuels, natural gas, synthetic fuels, liquid fuels, solid fuels, coal, biomass, solid municipal waste, coke, petroleum coke, virtually any hydrocarbon feedstock, and the like, or combinations thereof. In an embodiment, the carbon containing fuel comprises a carbonaceous feedstock containing nitrogen, such as coal, coke, petroleum coke, biomass, and the like, or combinations thereof. In an embodiment, the carbon containing fuel can comprise nitrogen in an amount of from about 0.1 weight % (wt. %) to about 5 wt. %, alternatively from about 0.25 wt. % to about 3 wt. %, alternatively from about 0.5 wt. % to about 2 wt. %, alternatively equal to or greater than about 0.1 wt. %, alternatively equal to or greater than about 0.25 wt. %, or alternatively equal to or greater than about 0.5 wt. %. Most of the nitrogen in the carbon containing fuel converts to nitrogen ($N_2$) gas during gasification. However, a portion of the nitrogen in the carbon containing fuel converts to ammonia and hydrogen cyanide during gasification. Nitrogen, ammonia, and hydrogen cyanide produced during gasification from the nitrogen in the carbon containing fuel are components of the raw syngas recovered from the gasification unit. Generally, gasification can be typically conducted with the addition of oxygen to a gasification unit, wherein the oxygen can comprise high purity oxygen, air, etc. As will be appreciated by one of skill in the art, and with the help of this disclosure, any nitrogen ($N_2$) introduced to the gasification unit with the oxygen (either as trace $N_2$ from the high purity $O_2$, or bulk $N_2$ from the air) will be recovered in the syngas as $N_2$.

In an embodiment, a method of producing syngas can comprise receiving raw syngas from a gasification unit. The raw syngas often requires further processing to meet product specifications, for example by removing solid particulates, as well as adjusting concentrations of components such as carbon dioxide ($CO_2$), hydrogen sulfide ($H_2S$), carbonyl sulfide (COS), nitrogen ($N_2$), ammonia ($NH_3$), hydrogen cyanide (HCN), and chlorides, as such concentrations vary with carbonaceous feedstock composition. For example, when syngas is produced by coal gasification, the solid particulates can comprise ash (which can be formed from inorganic impurities in the coal), as well as unconverted carbon fines. Some of these impurities can react to form microscopic solids which can be suspended in the raw syngas produced by gasification. The raw syngas leaving the gasification unit may contain fine ash and/or slag that need to be removed prior to sending the syngas downstream for further processing.

In some embodiments, a portion of the solid particulates can be removed using dry particulate removal systems such as filters (e.g., candle filters, high temperature ceramic filters) and/or cyclones to produce recovered solid particulates (e.g., recovered fly ash/slag), which can either be recycled to the gasification unit or purged from the system as a byproduct. The raw syngas leaving the dry particulate removal system can then be further purified by passing through a syngas scrubber (e.g., wet scrubber or aqueous scrubber) to produce unshifted syngas (e.g., water scrubbed raw syngas).

In some embodiments, a portion of the solid particulates can be removed using wet particulate removal systems such as water scrubber. In an embodiment, a method of producing syngas can comprise introducing at least a portion of the raw syngas and water to a syngas scrubber to produce an unshifted syngas, wherein all or a portion of solid particles present in the raw syngas are removed to yield the unshifted syngas, wherein the unshifted syngas comprises the components of the syngas such as carbon monoxide and water and have a reduced concentration of (or are free of, or substantially free of) any components that are removed via contact with water in the water scrubber (e.g., solid particles).

In an embodiment, the unshifted syngas exiting the particulate removal process (e.g., a dry or wet removal system) can be substantially free of solid particulates. In an embodiment, the unshifted syngas can comprise substantially none of the solid particulates of the raw syngas. In an embodiment, the unshifted syngas can comprise less than about 5 parts per million by weight (ppmw), alternatively less than about 1 ppmw, alternatively less than about 0.5 ppmw, or alternatively less than about 0.1 ppmw solid particulates.

In an embodiment, the syngas scrubber (e.g., a water scrubber) can comprise a trayed and/or packed column for removing solid particulates, such as fine char and ash particulates, wherein solid particulates recovered from the syngas scrubber can be recycled and fed to the gasification unit. Scrubbing the syngas in the syngas scrubber can also remove a portion of contaminants other than the solid particulates from the raw syngas, such as for example a portion of chlorides, ammonia, hydrogen sulfide, cyanide, and other trace contaminants.

Spent water can be recovered from the syngas scrubber, wherein the spent water can comprise a portion of the trace contaminants from the raw syngas. Spent water can be decanted in a gravity settler to remove fine particulates (e.g., solid particulates) and to yield a clarified spent water. Solid-concentrated underflows from the bottom of the gravity settler can be filtered to recover the solid particulates as a filter cake, which can then be either discarded or recycled to the gasifying unit, depending on its carbon content. The clarified spent water can be recycled back to the syngas scrubber and/or can be sent to a wastewater treatment system for disposal. Spent water can have a low free cyanide content (e.g., less than about 5 ppmw), and it can also comprise complexed cyanides, such as ferrocyanide complexes (e.g., $Fe(CN)_6^{4-}$).

In an embodiment, the raw syngas comprises cyanide in an amount of from about 2.5 parts per million volume (ppmv) to about 20 ppmv, alternatively from about 5 ppmv to about 20 ppmv, or alternatively from about 5 ppmv to about 15 ppmv. As will be appreciated by one of skill in the art, and with the help of this disclosure, the cyanide content of the raw syngas may vary substantially, depending on feedstock, gasifier type, moisture content of syngas, etc. Further, as will be appreciated by one of skill in the art, and with the help of this disclosure, the syngas scrubber removes a portion of the cyanide from the raw syngas, since the cyanide (e.g., $CN^-$, hydrogen cyanide) is soluble in water. For purposes of disclosure herein, the term "cyanide" refers to the cyanide anion ($CN^-$) and/or hydrogen cyanide (HCN). Further, for purposes of disclosure herein, a cyanide content can be reported with respect to the amount of $CN^-$ and/or HCN, as these two species have very similar molecular weights (e.g., molecular weights that differ by 1 Da).

In an embodiment, the unshifted syngas comprises cyanide in an amount of less than about 15 ppmv, alternatively less than about 12.5 ppmv, or alternatively less than about 10 ppmv. As will be appreciated by one of skill in the art, and with the help of this disclosure, the cyanide content of the unshifted syngas may vary substantially, depending on feedstock, gasifier type, moisture content of syngas, etc. In an embodiment, the unshifted syngas comprises hydrogen, carbon monoxide, and carbon dioxide, as well as water and other contaminants (e.g., HCN, $H_2S$, COS, $N_2$, $NH_3$, chlorides, etc.), wherein a portion of the contaminants can be dissolved in the water. As will be appreciated by one of skill in the art, and with the help of this disclosure, a portion of the contaminants can be in a gas state, and a portion of the contaminants can be dissolved in the water present in the unshifted syngas.

In an embodiment, a molar ratio of hydrogen to carbon monoxide in the raw syngas can be about the same as a molar ratio of hydrogen to carbon monoxide in the unshifted syngas as the amount of these two components is not altered in the removal of solids particles and/or water scrubbing of the raw syngas. That is, as will be appreciated by one of skill in the art, and with the help of this disclosure, the syngas scrubber does not change the molar ratio of hydrogen to carbon monoxide in the syngas, it only removes solid particulates and other contaminants. In an embodiment, the unshifted syngas can be characterized by a molar ratio of hydrogen to carbon monoxide of from about 0.5:1 to about 1.25:1, alternatively from about 0.8:1 to about 1.2:1, alternatively from about 0.6:1 to about 0.9:1, or alternatively from about 0.9:1 to about 1.1:1. The molar ratio of hydrogen to carbon monoxide in the unshifted syngas can be too low for some processes utilizing the syngas (e.g., methanol production, Fischer-Tropsch process, etc.), and thus the molar ratio of the unshifted syngas exiting the syngas scrubber can be adjusted by splitting the flow of the unshifted syngas, with a first portion bypassing a water gas shift unit and a second portion being fed to a water gas shift unit. More specifically, a portion of the unshifted syngas (e.g., a second unshifted syngas stream) can be sent to a water gas shift unit to produce a shifted syngas with an increased molar ratio of hydrogen to carbon monoxide, and the remainder of the unshifted syngas (e.g., a first unshifted syngas stream) can bypass the water gas shift unit, thereby retaining its original molar ratio of hydrogen to carbon monoxide. Subsequently, the unshifted syngas can be combined with the shifted syngas to achieve a desired molar ratio of hydrogen to carbon monoxide in a syngas product stream (e.g., a treated or modified syngas).

In an embodiment, a method of producing syngas can comprise introducing a first portion of the unshifted syngas to a first cooling unit to produce a cooled unshifted syngas and a first aqueous condensate. The first cooling unit can comprise one or more heat exchangers, and optionally at least one vapor-liquid separator (e.g., a flash drum). The heat exchangers may generate low pressure steam from cooling water used in the heat exchangers, wherein the low pressure steam can be typically recycled for utility usage, such as reboilers and/or power generation. Some vapor-liquid separators can utilize gravity in vertical vessels to cause a liquid (e.g., first aqueous condensate) to settle to the bottom of the vessel, wherein liquid components (e.g., first aqueous condensate) can be withdrawn from the bottom of the vapor-liquid separator, and wherein gaseous components (e.g., cooled unshifted syngas) can be recovered via a gas outlet located at the top of the vessel. Other vapor-liquid separators can be spinning centrifugal separators utilizing a centrifugal force to drive liquid components (e.g., first aqueous condensate) towards an outer edge of a separator chamber for removal, wherein gaseous components (e.g., cooled unshifted syngas) can migrate towards a center of the separator chamber.

In an embodiment, the first aqueous condensate can comprise cyanide in an amount of from about 5 ppmw to about 200 ppmw, alternatively from about 10 ppmw to about 150 ppmw, or alternatively from about 20 ppmw to about 100 ppmw. In an embodiment, at least a portion of the first aqueous condensate can be recycled to the syngas scrubber (e.g., to the water used in the syngas scrubber). In some embodiments, a portion of the first aqueous condensate can be optionally sent to a wastewater treatment system for disposal.

In an embodiment, a molar ratio of hydrogen to carbon monoxide in the cooled unshifted syngas can be about the same as a molar ratio of hydrogen to carbon monoxide in the unshifted syngas. As will be appreciated by one of skill in the art, and with the help of this disclosure, cooling the unshifted syngas and removing the first aqueous condensate from the unshifted syngas does not change the molar ratio of hydrogen to carbon monoxide in the syngas, it only removes water and any contaminants dissolved therein.

In an embodiment, the cooled unshifted syngas can be characterized by a cyanide content of less than about 15 ppmv, alternatively less than about 10 ppmv, or alternatively less than about 5 ppmv. As will be appreciated by one of skill in the art, and with the help of this disclosure, the cyanide content of the cooled unshifted syngas may vary substantially, depending on feedstock, gasifier type, moisture content of syngas, etc. Further, as will be appreciated by one of skill in the art, and with the help of this disclosure, most of the cyanide in the unshifted syngas will be dissolved in the first aqueous condensate, when the unshifted syngas is cooled and water therein condenses.

In an embodiment, a method of producing syngas can comprise introducing a second portion of the unshifted syngas to a water gas shift unit to produce a shifted syngas. In embodiments where the molar ratio of hydrogen to carbon monoxide in the unshifted syngas must be increased (e.g., adjusted) to meet downstream process requirements, the second portion of the unshifted syngas can be introduced to a water gas shift unit comprising a sour shift catalyst to convert carbon monoxide and water into additional hydrogen and carbon dioxide according to the general reaction $CO+H_2O \leftrightarrow H_2+CO_2$, also known as the water-gas shift (WGS) reaction. The WGS reaction can be conducted in the presence of a variety of sour shift catalysts at a WGS reaction temperature of from about 400° F. to about 900° F., alternatively from about 450° F. to about 850° F., or alternatively from about 500° F. to about 800° F. The WGS reaction does not change the total number of moles (e.g., two moles of products are produced from two moles of reactants), and as such an effect of pressure on the WGS reaction is minimal. The equilibrium of the WGS reaction can be shifted towards hydrogen production in the presence of high moisture content. Generally, excess moisture is present in the unshifted syngas that is recovered from the syngas scrubber, and such moisture is usually sufficient to drive the WGS reaction to achieve a required molar ratio of hydrogen to carbon monoxide. In an embodiment, steam can be further introduced to the water gas shift unit to increase the moisture content.

In some embodiments, the second portion of the unshifted syngas can be heated to a temperature that is greater than a syngas moisture saturation temperature by from about 20° F. to about 75° F., alternatively from about 25° F. to about 60° F., or alternatively from about 30° F. to about 50° F., prior to introducing the second portion of the unshifted syngas to the water gas shift unit. As will be appreciated by one of skill in the art, and with the help of this disclosure, if the temperature of the second portion of the unshifted syngas temperature is too low, the water could condense inside the water gas shift unit and such water condensation could damage the sour shift catalyst. The syngas moisture saturation temperature can be from about 350° F. to about 500° F., depending on the raw syngas composition and process conditions for producing the unshifted syngas.

In an embodiment, the water gas shift unit can comprise any suitable reactor, such as for example a fixed bed reactor, adiabatic reactor, radial reactor, and the like, or combinations thereof. In an embodiment, a water gas shift reactor can comprise a catalyst bed comprising a sour shift catalyst. In an embodiment, the water gas shift unit can be a multi-stage unit, for example the water gas shift unit can comprise multiple reactors and/or multiple fixed beds.

The WGS reaction can be catalyzed by both metals and metal oxides. Nonlimiting examples of sour shift catalysts suitable for use in the present disclosure include cobalt, molybdenum, copper, iron, a cobalt-molybdenum catalyst, a chromium promoted iron-based catalyst, a copper promoted iron-based catalyst, a copper-zinc-aluminum catalyst, copper oxide (CuO), iron oxide ($Fe_2O_3$), oxides thereof, and the like, or combinations thereof.

In an embodiment, at least a portion of the cyanide in the second portion of the unshifted syngas can be converted to ammonia in the water gas shift unit. Generally, cyanide can react with hydrogen (via a hydrogenation reaction) and/or water (via a hydrolysis reaction) to produce ammonia in the presence of a catalyst, such as for example a sour shift catalyst.

In an embodiment, the shifted syngas can be substantially free of cyanide. In an embodiment, the shifted syngas can comprise substantially none of the cyanide of the second portion of the unshifted syngas. In an embodiment, the shifted syngas can comprise cyanide in an amount of less than about 2 ppmv, alternatively less than about 1 ppmv, or alternatively less than about 0.5 ppmv.

In an embodiment, a molar ratio of hydrogen to carbon monoxide in the shifted syngas can be greater than a molar ratio of hydrogen to carbon monoxide in the unshifted syngas. In an embodiment, the shifted syngas can be characterized by a molar ratio of hydrogen to carbon monoxide of equal to or greater than about 100:1, alternatively from about 5:1 to about 100:1, alternatively from about 10:1 to about 75:1, or alternatively from about 15:1 to about 40:1. As will be appreciated by one of skill in the art, and with the help of this disclosure, the molar ratio of hydrogen to carbon monoxide depends on shifting (e.g., CO conversion via the WGS reaction) conditions (e.g., type of WGS unit, type of catalyst used in the WGS unit, etc.). Further, as will be appreciated by one of skill in the art, and with the help of this disclosure, full shifting (e.g., almost all CO undergoes the WGS reaction) can lead to hydrogen to carbon monoxide molar ratios of over 100:1 due to very small CO numbers; single stage, mild shifting can lead to hydrogen to carbon monoxide molar ratios of from about 5:1 to about 100:1; a more moderate level of full shift can lead to hydrogen to carbon monoxide molar ratios of about 75:1; and the hydrogen to carbon monoxide molar ratios decreases with catalyst age, wherein a two stage shift system can lead to hydrogen to carbon monoxide molar ratios of about 40:1.

In an embodiment, a method of producing syngas (e.g., a modified syngas) can comprise introducing at least a portion of the shifted syngas to a second cooling unit to produce a cooled shifted syngas and a second aqueous condensate. The second cooling unit can be any suitable cooling unit, such as for example a cooling unit as described for the first cooling unit. For purposes of the disclosure herein, all descriptions related to the first cooling unit (such as descriptions of heat exchangers, vapor-liquid separators, etc.) can be applied to the corresponding components of the second cooling unit (such as descriptions of heat exchangers, vapor-liquid separators, etc., respectively), unless otherwise specified herein.

In an embodiment, the second cooling unit can comprise one or more heat exchangers, and optionally at least one vapor-liquid separator (e.g., flash drum). The heat exchangers may generate low pressure steam from cooling water used in the heat exchangers, wherein the low pressure steam can be recycled to the syngas production process.

In an embodiment, the second aqueous condensate can comprise cyanide in an amount of less than about 2.5 ppmw, alternatively less than about 2 ppmw, or alternatively less than about 1 ppmw.

In an embodiment, a molar ratio of hydrogen to carbon monoxide in the cooled shifted syngas can be about the same as a molar ratio of hydrogen to carbon monoxide in the shifted syngas. As will be appreciated by one of skill in the art, and with the help of this disclosure, cooling the shifted syngas and removing the second aqueous condensate from the shifted syngas does not change the molar ratio of hydrogen to carbon monoxide in the syngas, it only removes water and any contaminants dissolved therein.

In an embodiment, the cooled shifted syngas can be characterized by a cyanide content of less than about 2 ppmv, alternatively less than about 1 ppmv, or alternatively less than about 0.5 ppmv. As will be appreciated by one of skill in the art, and with the help of this disclosure, most of the residual cyanide in the shifted syngas will be dissolved in the second aqueous condensate, when the shifted syngas is cooled and the water therein condensed.

In an embodiment, a method of producing syngas (e.g., a modified syngas) can comprise contacting at least a portion of the cooled shifted syngas with at least a portion of the cooled unshifted syngas to produce the modified syngas. In an embodiment, a molar ratio of hydrogen to carbon monoxide in the modified syngas can be greater than a molar ratio of hydrogen to carbon monoxide in the unshifted syngas, and a molar ratio of hydrogen to carbon monoxide in the modified syngas can be lower than a molar ratio of hydrogen to carbon monoxide in the shifted syngas.

In an embodiment, the modified syngas can be characterized by a molar ratio of hydrogen to carbon monoxide of from about 1.7:1 to about 3.2:1, alternatively from about 1.7:1 to about 2.5:1, alternatively from about 1.8:1 to about 2.3:1, or alternatively from about 1.9:1 to about 2.1:1. In some embodiments, the modified syngas can be characterized by a molar ratio of hydrogen to carbon monoxide of about 2:1, which is a typical ratio employed in Fischer-Tropsch reactions. In other embodiments, the modified syngas can be characterized by a molar ratio of hydrogen to carbon monoxide of about 3:1, which is a typical ratio employed for substitute natural gas production.

In an embodiment, the modified syngas can be used as a feedstock in one or more downstream processes, for example for the production of methanol, substitute natural gas, liquid hydrocarbons, and the like, or combinations thereof.

In an embodiment, the modified syngas can be converted to methanol via the general reaction $2H_2+CO \rightarrow CH_3OH$. Carbon dioxide in the modified syngas can also be converted to methanol via the general reaction $CO_2+3H_2 \rightarrow CH_3OH+H_2O$. Methanol can be produced from syngas via a gas phase process, or a liquid phase process. A gas phase process for methanol production can be carried out in fixed-bed reactors comprising catalysts at high pressure (e.g., from about 600 psig to about 1,700 psig), wherein the reactor can be operated as an adiabatic reactor. Catalyst systems used for methanol synthesis from syngas can comprise mixtures of copper, zinc oxide, alumina and magnesia; however, carbon, nitrogen, and platinum can also be used.

In an embodiment, the modified syngas can be converted to substitute natural gas or synthetic natural gas via a methanation process. Generally, the methanation process can convert carbon monoxide and hydrogen in syngas to methane and water via the general reaction $CO+3H_2 \rightarrow CH_4+H_2O$. The methanation process can also convert carbon dioxide and hydrogen in the syngas to methane and water via the general reaction $CO_2+4H_2 \rightarrow CH_4+2H_2O$. The methanation reactions can take place over catalysts (e.g., nickel-based catalysts, ruthenium-based catalysts, molybdenum-based catalysts, tungsten-based catalysts, etc.) in fixed-bed reactors. Generally, sulfur-based compounds have to be removed from syngas prior to a methanation process, since sulfur in the syngas can poison nickel-based methanation catalysts.

In an embodiment, the modified syngas can be converted to liquid hydrocarbons via a Fischer-Tropsch (FT) process, wherein the liquid hydrocarbons can be used in gasoline, diesel fuel, jet fuel, etc. The FT process is generally based on a catalytic chemical reaction in which carbon monoxide and hydrogen in the syngas are converted into hydrocarbons of various molecular weights according to the general reaction $(2n+1)H_2 + nCO \rightarrow C_nH_{2n+2} + nH_2O$, wherein n is an integer. FT process conditions can be selected to maximize formation of higher molecular weight hydrocarbon liquid fuels, which are higher value products. Depending on catalyst, temperature, and type of process employed, an FT process can produce a mixture of hydrocarbons ranging from methane to higher molecular weight paraffins, aromatic hydrocarbons, and olefins; as well as small amounts of low molecular weight oxygenates (e.g., alcohol and organic acids). Fuel gases like methane, propane and butane can usually be formed in FT synthesis, but are generally minimized or recycled to yield a maximum amount of high-value liquid products. Waxes (longer-chain paraffins with 20 to 40 carbon molecules that are solid at standard conditions) can also be formed in an FT process; however, such waxes can be cracked to shorter, liquid forms. FT catalysts can comprise transition metals, such as iron, cobalt, nickel, ruthenium, etc.

In an embodiment, a method of producing syngas (e.g., a modified syngas) can comprise introducing at least a portion of the second aqueous condensate to a sour water stripper to produce an acid gas and stripped water. In an embodiment, the method of producing syngas as disclosed herein can exclude contacting at least a portion of the first aqueous condensate with at least a portion of the second aqueous condensate. As will be appreciated by one of skill in the art, and with the help of this disclosure, the first aqueous condensate can contain a relatively large amount of cyanide, when compared to the second aqueous condensate which can be substantially free of cyanide, and consequently, processing the second aqueous condensate without mixing it with the first aqueous condensate can allow for manufacturing equipment for processing the second aqueous condensate to be made from less expensive alloys (e.g., carbon steel alloys), as opposed to special steel alloys, such as titanium-steel alloys and/or nickel-chromium-molybdenum-tungsten alloys, required to handle aqueous streams rich in cyanide. For example, in an embodiment none, or substantially none, of the first aqueous condensate is passed to a sour water stripper commonly used to process the second aqueous condensate.

In an embodiment, the sour water stripper and associated piping and equipment used to process the cyanide-free (or substantially cyanide-free) second aqueous condensate can be fabricated from materials comprising carbon steel, owing to a low cyanide content in the second aqueous condensate. In an embodiment, the sour water stripper and associated piping and equipment can be fabricated from materials excluding a nickel-chromium-molybdenum-tungsten alloy (e.g. HASTELLOY C alloys), a titanium-steel alloy, and the like, or combinations thereof. Nonlimiting examples of HASTELLOY C alloys include HASTELLOY CW6M alloy, HASTELLOY CW2M alloy, HASTELLOY CX2MW alloy, HASTELLOY C X2M alloy, and the like, or combinations thereof. Conventional sour water strippers can employ any grade of HASTELLOY C for equipment and piping. For valve trim, conventional sour water strippers can employ cast grades of HASTELLOY C, such as HASTELLOY CW6M alloy, HASTELLOY CW2M alloy, HASTELLOY CX2MW alloy, and/or HASTELLOY C X2M alloy.

For purposes of the disclosure herein, the terms "second aqueous condensate" and "sour water" can be used interchangeably and refer to water that contains sulfide. Generally, refineries and gasification plants that process feedstocks containing sulfur can liberate the sulfur in various unit operations as hydrogen sulfide, and such hydrogen sulfide can end up in various process water streams. Reuse or disposal of sour water requires removing the sulfides from the water in a process called stripping, such as for example in a sour water stripper. Generally, sour water can contain significant amounts of hydrogen sulfide ($H_2S$), for example equal to or greater than about 10 parts per million by weight (ppmw), alternatively equal to or greater than about 50 ppmw, or alternatively equal to or greater than about 100 ppmw. In an embodiment, the sour water can comprise ammonia in an amount of equal to or greater than about 2,000 ppmw, alternatively equal to or greater than about 10,000 ppmw, or alternatively equal to or greater than about 20,000 ppmw. In an embodiment, the sour water can comprise carbon dioxide in an amount of equal to or greater than about 0.3 wt. %, alternatively equal to or greater than about 3 wt. %, or alternatively equal to or greater than about 5 wt. %.

In an embodiment, the sour water stripper can comprise any suitable stripping column (e.g., desorption column), wherein a gas or vapor phase (e.g., steam) interacts with a liquid phase (e.g., second aqueous condensate) via co-current flow, counter-flow (e.g., countercurrent), or cross-flow. Generally, stripping columns can be vertical and cylindrical columns or towers. In an embodiment, the sour water stripper can comprise a countercurrent stripping column, wherein a portion of the gas or vapor phase (e.g., steam) can be introduced to the column countercurrent (e.g., opposing flow directions) to the flow of second aqueous condensate. In an embodiment, the second aqueous condensate can be introduced as a downflow at the top of the sour water stripper, and the gas or vapor phase (e.g., steam) can be introduced (e.g., bubbled) at the bottom of the sour water stripper. In such embodiment, the acid gas can be recovered at the top of the sour water stripper, and the stripped water can be recovered at the bottom of the sour water stripper. In some embodiments, the sour water stripper can comprise a packed bed column, a tray column, a spray column, a falling film column, a bubble column, a sparged tank column, and the like, or combinations thereof.

In an embodiment, sour water can be stripped by heating the sour water with external steam, steam generated by a reboiler, a hot hydrocarbon stripping vapor, and the like, or combinations thereof. As will be appreciated by one of skill in the art, and with the help of this disclosure, increasing a temperature of the sour water in the sour water stripper could enable the sour water to release gases (e.g., acid gases such as hydrogen sulfide, ammonia, carbon dioxide, etc.). The steam can remove and carry hydrogen sulfide, ammonia, and carbon dioxide, out of the sour water stripper. Generally, application of heat to the sour water can generate internal stripping steam, although live steam injection can be used to achieve the same, and live steam and/or generated steam can carry hydrogen sulfide, ammonia, and carbon dioxide out of the sour water. In an embodiment, the sour water stripper can comprise a live steam injected tower or a tower comprising a reboiler, wherein the tower can be a trayed column, and wherein gases (e.g., an acid gas) can be removed from the sour water by steam stripping.

In an embodiment, stripped water can be recovered from the sour water stripper. In an embodiment, the stripped water can comprise cyanide in an amount of less than about 2 ppmw, alternatively less than about 1 ppmw, or alternatively less than about 0.5 ppmw. Generally, stripped water can comprise very low levels of residual ammonia (e.g., less than about 25 ppmw ammonia), very low levels of residual hydrogen sulfide (e.g., less than about 10 ppmw hydrogen sulfide), and very low levels of residual carbon dioxide (e.g., less than about 1 ppmw carbon dioxide).

In some embodiments, the stripped water can be recycled as process water, for example at least a portion of the stripped water can be used for generating the steam introduced to the sour water stripper. In other embodiments, the stripped water can be subjected to mild, bulk stripping and then can be recycled to the process, for example to contact an acidic aqueous stream to increase the pH of the acidic aqueous stream, wherein the acidic aqueous stream has a pH lower than a pH of the stripped water. As will be appreciated by one of skill in the art, and with the help of this disclosure, the ammonia in the stripped water can neutralize acidic species present in the acidic aqueous stream, thereby increasing the pH. Neutralizing acidic species in acidic aqueous streams may enable the use of less expensive piping and equipment for handling the acidic aqueous streams upon neutralizing acidic species, for example may enable the use of carbon steel in piping and equipment for handling the acidic aqueous streams upon neutralizing acidic species.

In an embodiment, the sour water stripper can comprise a pump-around system for generating a reflux to the column and/or an overhead condenser to reduce a water content in the acid gas.

In an embodiment, a pump-around stream can be communicated from the sour water stripper to a third cooling unit to produce a cooled pump-around stream, wherein at least a portion of the cooled pump-around stream can be recycled to the sour water stripper. The cooled pump-around stream can comprise water and ammonia, and very low amounts of hydrogen sulfide. As will be appreciated by one of skill in the art, and with the help of this disclosure, a solubility of ammonia in water at a reflux temperature (where the pump-around stream is collected from the sour water stripper) is significantly higher than a solubility of hydrogen sulfide in the water at the same reflux temperature.

The third cooling unit can be any suitable cooling unit, such as for example a cooling unit as described for the first cooling unit and/or the second cooling unit. For purposes of the disclosure herein, all descriptions related to the first cooling unit and/or the second cooling unit (such as descriptions of heat exchangers, vapor-liquid separators, etc.) can be applied to the corresponding components of the third cooling unit (such as descriptions of heat exchangers, vapor-liquid separators, etc., respectively), unless otherwise specified herein. In an embodiment, the third cooling unit can comprise one or more heat exchangers, and optionally at least one vapor-liquid separator (e.g., flash drum).

In an embodiment, the third cooling unit and associated piping and equipment can be fabricated from materials comprising carbon steel, owing to a low cyanide content in the pump-around stream. In an embodiment, the third cooling unit and associated piping and equipment can be fabricated from materials excluding titanium-steel alloys, nickel-chromium-molybdenum-tungsten alloys such as HASTELLOY C alloys, and the like, or combinations thereof.

In an embodiment, the cooled pump-around stream can comprise ammonia in an amount of from about 2 wt. % to about 20 wt. %, alternatively from about 4 wt. % to about 15 wt. %, or alternatively from about 6 wt. % to about 12 wt. %. In an embodiment, the cooled pump-around stream can be characterized by a pH of from about 7.5 to about 11, alternatively from about 7.8 to about 10.5, or alternatively from about 8 to about 10. As will be appreciated by one of skill in the art, and with the help of this disclosure, ammonia is a weak base, and the presence of ammonia in the cooled pump-around stream increases its pH.

In an embodiment, the cooled pump-around stream can be substantially free of cyanide. In an embodiment, the cooled pump-around stream can comprise cyanide in an amount of less than about 20 ppmw, alternatively less than about 10 ppmw, alternatively less than about 5 ppmw, alternatively less than about 1 ppmw, alternatively less than about 0.5 ppmw, or alternatively less than about 0.1 ppmw.

In an embodiment, a slip stream can be removed (e.g., recovered) from the cooled pump-around stream, wherein the slip stream comprises a portion of the cooled pump-around stream. In an embodiment, the slip stream can be from about 0 vol. % to about 5 vol. %, alternatively from about 0.5 vol. % to about 4.5 vol. %, or alternatively from about 1 vol. % to about 4 vol. % of the cooled pump-around stream.

In an embodiment, at least a portion of the slip stream can be contacted with an acidic aqueous stream to increase the pH of the acidic aqueous stream, wherein the acidic aqueous stream has a pH lower than a pH of the cooled pump-around stream. As will be appreciated by one of skill in the art, and with the help of this disclosure, the ammonia in the slip stream can neutralize acidic species present in the acidic aqueous stream, thereby increasing the pH. Neutralizing acidic species in acidic aqueous streams may enable the use of less expensive piping and equipment for handling the acidic aqueous streams upon neutralizing acidic species, for example may enable the use of carbon steel in piping and equipment for handling the acidic aqueous streams upon neutralizing acidic species.

In an embodiment, the acid gas recovered from the sour water stripper can comprise hydrogen sulfide, carbon dioxide, and ammonia. For purposes of the disclosure herein, the terms "sour gas" and "acid gas" can be used interchangeably and refer to gases comprising hydrogen sulfide and ammonia, and typically also carbon dioxide. Generally, the acid gas can include significant quantities of sulfur-containing compounds, including hydrogen sulfide, and sulfur dioxide, and optionally carbon sulfide, carbonyl sulfide, and/or carbon disulfide, in addition to appreciable quantities of carbon dioxide and ammonia, and further contaminants, including phenol. The acid gas can contain significant amounts of hydrogen sulfide ($H_2S$). As will be appreciated by one of skill in the art, and with the help of this disclosure, the composition and physical properties (e.g., temperature, pressure, etc.) of the acid gas can vary depending on its source.

In an embodiment, the acid gas (e.g., acid gas obtained from a sour water stripper) can comprise sulfur-containing compounds, including hydrogen sulfide, in an amount of equal to or greater than about 1 mole % (mol %), alternatively equal to or greater than about 3 mol %, alternatively equal to or greater than about 5 mol %, alternatively equal to or greater than about 10 mol %, alternatively equal to or greater than about 15 mol %, or alternatively equal to or greater than about 20 mol %.

In an embodiment, a molar ratio of ammonia to hydrogen sulfide in the acid gas (e.g., acid gas obtained from a sour water stripper) can be equal to or greater than about 1:1, alternatively equal to or greater than about 1.5:1, alternatively equal to or greater than about 2:1, or alternatively equal to or greater than about 3:1.

In an embodiment, the acid gas (e.g., acid gas obtained from a sour water stripper) can comprise carbon dioxide in an amount of equal to or greater than about 5 mol %, alternatively equal to or greater than about 10 mol %, alternatively equal to or greater than about 15 mol %, alternatively equal to or greater than about 20 mol %, or alternatively equal to or greater than about 25 mol %.

In an embodiment, a method of producing syngas can further comprise introducing at least a portion of the acid gas to a sulfur recovery unit to produce sulfur (e.g., elemental sulfur). In some embodiments, at least a portion of ammonia can be removed from the acid gas prior to introducing the acid gas to a sulfur recovery unit, as some sulfur recovery units cannot process acid gases with an elevated ammonia content.

In an embodiment, the sulfur recovery unit can be based on the Claus reaction, wherein hydrogen sulfide reacts with oxygen to produce elemental sulfur and water. Generally, the sulfur recovery unit can be located in a Claus plant for producing elemental sulfur. As will be appreciated by one of skill in the art and with the help of this disclosure, the acid gas need not be entirely depleted of ammonia for feeding to a sulfur recovery unit in a Claus plant. The acid gas can contain quantities of ammonia suitable for feeding into a sulfur recovery unit in a Claus plant, e.g., the acid gas can have an ammonia content of from about 0.1 mol % to about 10 mol %, alternatively from about 0.5 mol % to about 7 mol %, alternatively from about 1 mol % to about 5 mol %, or alternatively from about 1 mol % to about 3 mol %.

In an embodiment, a method of producing syngas can comprise (a) converting a carbon containing fuel to raw syngas in a gasification unit, wherein the carbon containing fuel comprises coal, coke, petroleum coke, biomass, and the like, or combinations thereof, wherein the carbon containing fuel comprises nitrogen in an amount of equal to or greater than about 0.5 wt. %, and wherein the raw syngas comprises carbon monoxide, hydrogen, and solid particulates; (b) introducing at least a portion of the raw syngas and water to a syngas scrubber to produce unshifted syngas, wherein the unshifted syngas comprises carbon monoxide and hydrogen, and wherein a molar ratio of hydrogen to carbon monoxide in the raw syngas is about the same as a molar ratio of hydrogen to carbon monoxide in the unshifted syngas; (c) introducing a first unshifted syngas to a first cooling unit to produce a cooled unshifted syngas and a first aqueous condensate, wherein the first unshifted syngas comprises a portion of the unshifted syngas, and wherein the first aqueous condensate comprises cyanide in an amount of from about 20 ppmw to about 100 ppmw; (d) recycling at least a portion of the first aqueous condensate to the syngas scrubber; (e) introducing a second unshifted syngas to a water gas shift unit to produce a shifted syngas, wherein the water gas shift unit comprises a cobalt-molybdenum catalyst, wherein the second unshifted syngas comprises a portion of the unshifted syngas, wherein a molar ratio of hydrogen to carbon monoxide in the shifted syngas is greater than a molar ratio of hydrogen to carbon monoxide in the unshifted syngas, and wherein at least a portion of the cyanide in the second unshifted syngas is converted to ammonia in the water gas shift unit; (f) introducing at least a portion of the shifted syngas to a second cooling unit to produce a cooled shifted syngas and a second aqueous condensate, wherein the second aqueous condensate comprises cyanide in an amount of less than about 1 ppmw; (g) contacting at least a portion of the cooled shifted syngas with at least a portion of the cooled unshifted syngas to produce syngas, wherein a molar ratio of hydrogen to carbon monoxide in the syngas is lower than a molar ratio of hydrogen to carbon monoxide in the shifted syngas, wherein the unshifted syngas is characterized by a molar ratio of hydrogen to carbon monoxide of from about 0.5:1 to about 1.25:1, and wherein the syngas is characterized by a molar ratio of hydrogen to carbon monoxide of from about 1.7:1 to about 3.2:1; (h) introducing at least a portion of the second aqueous condensate and steam to a sour water stripper to produce an acid gas and stripped water, wherein the acid gas comprises hydrogen sulfide, carbon dioxide, and ammonia, and wherein the sour water stripper and associated piping and equipment are fabricated from materials comprising carbon steel; (i) communicating a pump-around stream from the sour water stripper to a third cooling unit to produce a cooled pump-around stream, wherein at least a portion of the cooled pump-around stream is recycled to the sour water stripper, wherein the cooled pump-around stream comprises cyanide in an amount of less than about 20 ppmw, wherein the cooled pump-around stream is characterized by a pH of from about 7.5 to about 11, and wherein the third cooling unit and associated piping and equipment are fabricated from materials comprising carbon steel; (j) recycling at least a portion of the stripped water as steam to the sour water stripper; and (k) introducing at least a portion of the acid gas to a sulfur recovery unit in a Claus plant to produce elemental sulfur. In such embodiment, the method of producing syngas excludes contacting at least a portion of the first aqueous condensate with at least a portion of the second aqueous condensate.

Figure 1:
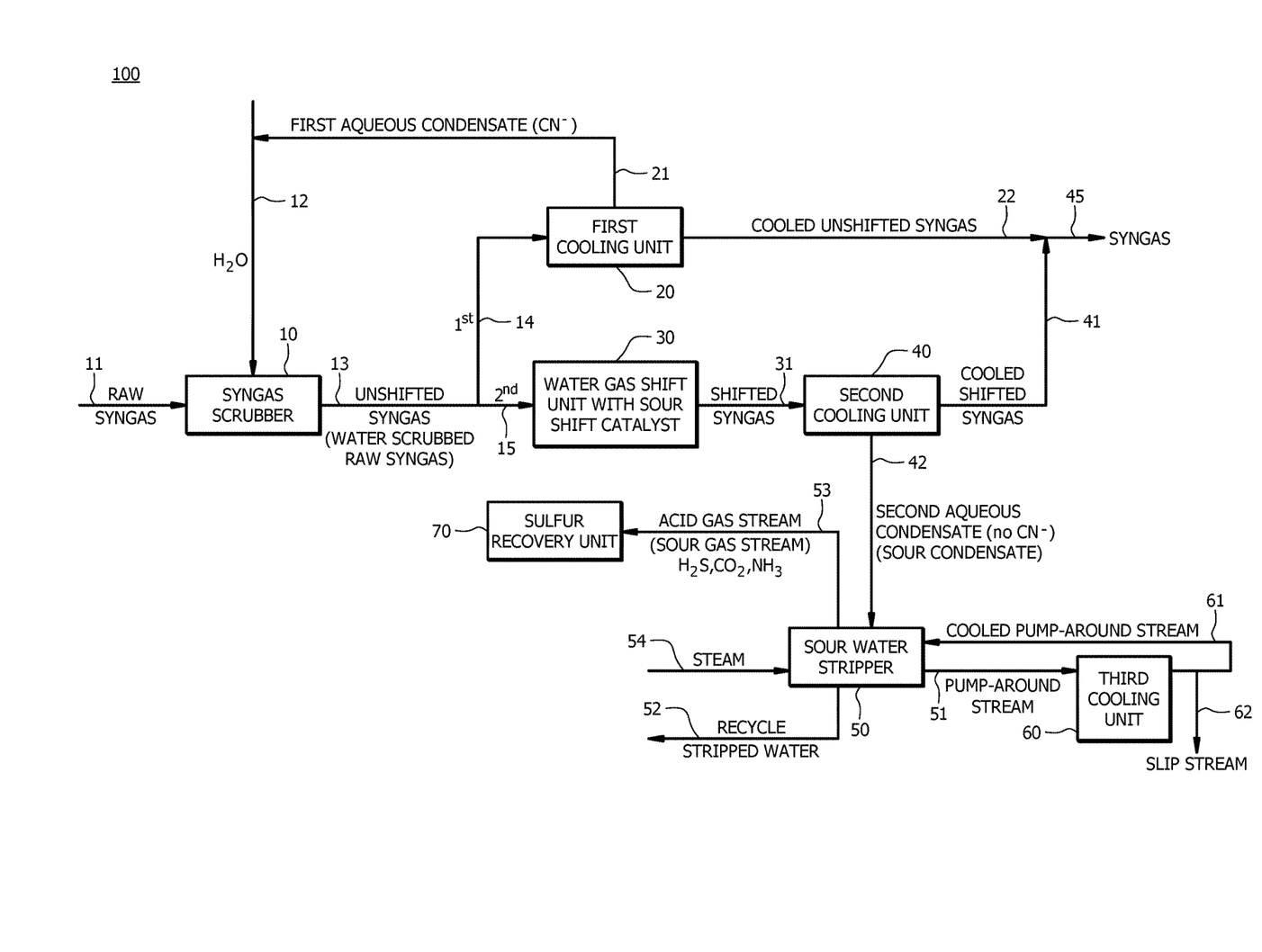
FIG. 1 displays a schematic of a process for producing synthesis gas (syngas).

Referring to the embodiment of FIG. 1, a syngas production system 100 is disclosed. The syngas production system 100 generally comprises a syngas scrubber 10; a first cooling unit 20; a water gas shift unit 30; a second cooling unit 40; a sour water stripper 50; a third cooling unit 60; and a sulfur recovery unit 70. As will be appreciated by one of skill in the art, and with the help of this disclosure, components of the syngas production system can be in fluid communication with each other through any suitable conduits (e.g., pipes, streams, etc.).

In an embodiment, a method of producing syngas can comprise (a) converting a carbon containing fuel to a raw syngas stream 11 in a gasification unit, wherein the carbon containing fuel comprises coal, coke, petroleum coke, biomass, and the like, or combinations thereof, wherein the carbon containing fuel comprises nitrogen in an amount of equal to or greater than about 0.5 wt. %, and wherein the raw syngas comprises carbon monoxide, hydrogen, and solid particulates; (b) introducing at least a portion of the raw syngas stream 11 and a water stream 12 to a syngas scrubber 10 to produce an unshifted syngas stream 13, wherein the unshifted syngas comprises carbon monoxide and hydrogen, and wherein a molar ratio of hydrogen to carbon monoxide in the raw syngas is about the same as a molar ratio of hydrogen to carbon monoxide in the unshifted syngas; (c) introducing a first unshifted syngas stream 14 to a first cooling unit 20 to produce a cooled unshifted syngas stream 22 and a first aqueous condensate stream 21, wherein the first unshifted syngas stream 14 comprises a portion of the unshifted syngas stream 13, and wherein the first aqueous condensate comprises cyanide in an amount of from about 20 ppmw to about 100 ppmw; (d) recycling at least a portion of the first aqueous condensate stream 21 to the syngas scrubber 10; (e) introducing a second unshifted syngas stream 15 to a water gas shift unit 30 to produce a shifted syngas stream 31, wherein the water gas shift unit 30 comprises cobalt-molybdenum catalyst, wherein the second unshifted syngas stream 15 comprises a portion of the unshifted syngas stream 13, wherein a molar ratio of hydrogen to carbon monoxide in the shifted syngas is greater than a molar ratio of hydrogen to carbon monoxide in the unshifted syngas, and wherein at least a portion of the cyanide in the second unshifted syngas is converted to ammonia in the water gas shift unit 30; (f) introducing at least a portion of the shifted syngas stream 31 to a second cooling unit 40 to produce a cooled shifted syngas stream 41 and a second aqueous condensate stream 42 (e.g., sour water or sour condensate), wherein the second aqueous condensate comprises cyanide in an amount of less than about 1 ppmw; (g) contacting at least a portion of the cooled shifted syngas stream 41 with at least a portion of the cooled unshifted syngas stream 22 to produce syngas 45, wherein a molar ratio of hydrogen to carbon monoxide in the syngas 45 is lower than a molar ratio of hydrogen to carbon monoxide in the shifted syngas, wherein the unshifted syngas is characterized by a molar ratio of hydrogen to carbon monoxide of from about 0.5:1 to about 1.25:1, and wherein the syngas 45 is characterized by a molar ratio of hydrogen to carbon monoxide of from about 1.7:1 to about 3.2:1; (h) introducing at least a portion of the second aqueous condensate stream 42 and a steam stream 54 to a sour water stripper 50 to produce an acid gas stream 53 and a stripped water stream 52, wherein the acid gas comprises hydrogen sulfide, carbon dioxide, and ammonia, and wherein the sour water stripper and associated piping and equipment are fabricated from materials comprising carbon steel; (i) communicating a pump-around stream 51 from the sour water stripper 50 to a third cooling unit 60 to produce a cooled pump-around stream 61, wherein at least a portion of the cooled pump-around stream 61 is recycled to the sour water stripper 50, wherein the cooled pump-around stream 61 comprises cyanide in an amount of less than about 20 ppmw, wherein the cooled pump-around stream 61 is characterized by a pH of from about 7.5 to about 11, and wherein the third cooling unit 60 and associated piping and equipment are fabricated from materials comprising carbon steel; (j) recycling at least a portion of the stripped water stream 52 as steam to the sour water stripper 50; and (k) introducing at least a portion of the acid gas stream 53 to a sulfur recovery unit 70 in a Claus plant to produce elemental sulfur. In such embodiment, the method of producing syngas excludes contacting at least a portion of the first aqueous condensate stream 21 with at least a portion of the second aqueous condensate stream 42. In an embodiment, exclusion of cyanides from the sour water stripper can result in carbon steel metallurgy for the sour water stripper. In an embodiment, a high pH pump-around stream from sour water stripper (e.g., slip stream 62) can neutralize acidic aqueous streams.

In an embodiment, a method of producing syngas as disclosed herein can advantageously display improvements in one or more method characteristics when compared to conventional methods of producing syngas. The method for producing syngas as disclosed herein can advantageously avoid significant amounts of cyanide in the sour water stripper feed, which in turn can enable the use of carbon steel metallurgy for the sour water stripper, thereby saving substantial capital investment. Conventional methods of producing syngas utilize expensive materials (e.g., titanium-steel alloys, nickel-chromium-molybdenum-tungsten alloys such as HASTELLOY C alloys) of construction for handling cyanide containing streams in gasification plants.

In an embodiment, a method of producing syngas as disclosed herein can advantageously allow for introducing a slip stream containing ammonia from the pump-around stream into the circulating aqueous streams with low pH, which in turn can minimize acid corrosion in the associated equipment and piping. In an embodiment, neutralization of acidic circulating streams can also advantageously allow for material downgrades to carbon steel, in addition to reduced corrosion rates. Additional advantages of the methods for the production of syngas as disclosed herein can be apparent to one of skill in the art viewing this disclosure.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. §1.72 and the purpose stated in 37 C.F.R. §1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggested to one of ordinary skill in the art without departing from the spirit of the present invention or the scope of the appended claims.

Additional Disclosure

A first embodiment, which is a method of producing synthesis gas (syngas) comprising (a) receiving raw syngas from a gasification unit; (b) introducing at least a portion of the raw syngas and water to a syngas scrubber to produce unshifted syngas; (c) introducing a first portion of the unshifted syngas to a first cooling unit to produce a cooled unshifted syngas and a first aqueous condensate, wherein the first aqueous condensate comprises cyanide in an amount of from about 5 parts per million by weight (ppmw) to about 200 ppmw; (d) recycling at least a portion of the first aqueous condensate to the syngas scrubber; (e) introducing a second portion of the unshifted syngas to a water gas shift unit to produce a shifted syngas, wherein a molar ratio of hydrogen to carbon monoxide in the shifted syngas is greater than a molar ratio of hydrogen to carbon monoxide in the unshifted syngas; (f) introducing at least a portion of the shifted syngas to a second cooling unit to produce a cooled shifted syngas and a second aqueous condensate, wherein the second aqueous condensate comprises cyanide in an amount of less than about 2.5 ppmw; (g) contacting at least a portion of the cooled shifted syngas with at least a portion of the cooled unshifted syngas to produce a modified syngas, wherein a molar ratio of hydrogen to carbon monoxide in the modified syngas is greater than a molar ratio of hydrogen to carbon monoxide in the unshifted syngas, and wherein the molar ratio of hydrogen to carbon monoxide in the modified syngas is lower than a molar ratio of hydrogen to carbon monoxide in the shifted syngas; and (h) introducing at least a portion of the second aqueous condensate to a sour water stripper to produce an acid gas and stripped water, wherein the acid gas comprises hydrogen sulfide, carbon dioxide, and ammonia.

A second embodiment, which is the method of the first embodiment, wherein none of the first aqueous condensate is introduced to the sour water stripper.

A third embodiment, which is the method of any one of the first and the second embodiments, wherein the stripped water comprises cyanide in an amount of less than about 2 ppmw.

A fourth embodiment, which is the method of any one of the first through the third embodiments, wherein the stripped water is recycled as process water.

A fifth embodiment, which is the method of any one of the first through the fourth embodiments, wherein a pump-around stream is communicated from the sour water stripper to a third cooling unit to produce a cooled pump-around stream, wherein at least a portion of the cooled pump-around stream is recycled to the sour water stripper.

A sixth embodiment, which is the method of the fifth embodiment, wherein the cooled pump-around stream comprises water and ammonia.

A seventh embodiment, which is the method of any one of first through the sixth embodiments, wherein the cooled pump-around stream is characterized by a pH of from about 7.5 to about 11.

An eighth embodiment, which is the method of any one of the first through the seventh embodiments, wherein the cooled pump-around stream comprises cyanide in an amount of less than about 20 ppmw.

A ninth embodiment, which is the method of any one of the first through the eighth embodiments, wherein a slip stream comprising a portion of the cooled pump-around stream is contacted with an acidic aqueous stream to increase the pH of the acidic aqueous stream, wherein the acidic aqueous stream has a pH lower than a pH of the cooled pump-around stream.

A tenth embodiment, which is the method of the ninth embodiment, wherein the slip stream is from about 0 vol. % to about 5 vol. % of the cooled pump-around stream.

An eleventh embodiment, which is the method of any one of the first through the tenth embodiments, wherein the second portion of the unshifted syngas comprises cyanide, and wherein at least a portion of the cyanide in the second portion of the unshifted syngas is converted to ammonia in the water gas shift unit.

A twelfth embodiment, which is the method of any one of the first through the eleventh embodiments, wherein the water gas shift unit comprises a sour shift catalyst comprising cobalt, molybdenum, copper, iron, cobalt-molybdenum catalyst, a chromium promoted iron-based catalyst, a copper promoted iron-based catalyst, a copper-zinc-aluminum catalyst, copper oxide ($CuO$), iron oxide ($Fe_2O_3$), oxides thereof, or combinations thereof.

A thirteenth embodiment, which is the method of any one of the first through the twelfth embodiments, wherein the sour water stripper, a third cooling unit, and associated piping and equipment are fabricated from materials comprising carbon steel.

A fourteenth embodiment, which is the method of any one of the first through the thirteenth embodiments, wherein the sour water stripper, a third cooling unit, and associated piping and equipment are fabricated from materials excluding nickel-chromium-molybdenum-tungsten alloys, titanium-steel alloys, or combinations thereof.

A fifteenth embodiment, which is the method of any one of the first through the fourteenth embodiments, wherein a molar ratio of hydrogen to carbon monoxide in the raw syngas is about the same as the molar ratio of hydrogen to carbon monoxide in the unshifted syngas.

A sixteenth embodiment, which is the method of any one of the first through the fifteenth embodiments, wherein the raw syngas comprises cyanide in an amount of from about 5 ppmv to about 15 ppmv.

A seventeenth embodiment, which is the method of any one of the first through the sixteenth embodiments, wherein the unshifted syngas comprises cyanide in an amount of less than about 15 ppmv.

An eighteenth embodiment, which is the method of any one of the first through the seventeenth embodiments, wherein the shifted syngas comprises cyanide in an amount of less than about 1 ppmv.

A nineteenth embodiment, which is the method of any one of the first through the eighteenth embodiments, wherein the raw syngas is produced by gasification of a carbon containing fuel in the gasification unit, wherein the carbon containing fuel comprises nitrogen in an amount of equal to or greater than about 0.5 wt. %.

A twentieth embodiment, which is the method of the nineteenth embodiment, wherein the carbon containing fuel comprises coal, coke, petroleum coke, biomass, or combinations thereof.

A twenty-first embodiment, which is the method of any one of the first through the twentieth embodiments, wherein the syngas is used for the production of methanol, substitute natural gas, liquid hydrocarbons, or combinations thereof.

A twenty-second embodiment, which is the method of any one of the first through the twenty-first embodiments, wherein the syngas is characterized by a molar ratio of hydrogen to carbon monoxide of from about 1.7:1 to about 3.2:1.

A twenty-third embodiment, which is the method of any one of the first through the twenty-second embodiments, wherein the unshifted syngas is characterized by a molar ratio of hydrogen to carbon monoxide of from about 0.5:1 to about 1.25:1.

A twenty-fourth embodiment, which is the method of any one of the first through the twenty-third embodiments further comprising introducing at least a portion of the acid gas to a sulfur recovery unit to produce sulfur.

A twenty-fifth embodiment, which is a method of producing synthesis gas (syngas) comprising (a) converting a carbon containing fuel to raw syngas in a gasification unit, wherein the carbon containing fuel comprises nitrogen in an amount of equal to or greater than about 0.5 wt. %, and wherein the raw syngas comprises carbon monoxide, hydrogen, and solid particulates; (b) introducing at least a portion of the raw syngas and water to a syngas scrubber to remove at least a portion of the solid particulates from the raw syngas to produce unshifted syngas, and wherein a molar ratio of hydrogen to carbon monoxide in the raw syngas is about the same as a molar ratio of hydrogen to carbon monoxide in the unshifted syngas; (c) introducing a first portion of the unshifted syngas to a first cooling unit to produce a cooled unshifted syngas and a first aqueous condensate, wherein the first aqueous condensate comprises cyanide in an amount of from about 20 ppmw to about 100 ppmw; (d) recycling at least a portion of the first aqueous condensate to the syngas scrubber; (e) introducing a second portion of the unshifted syngas to a water gas shift unit to produce a shifted syngas, wherein a molar ratio of hydrogen to carbon monoxide in the shifted syngas is greater than the molar ratio of hydrogen to carbon monoxide in the unshifted syngas, and wherein at least a portion of the cyanide in the second portion of the unshifted syngas is converted to ammonia in the water gas shift unit; (f) introducing at least a portion of the shifted syngas to a second cooling unit to produce a cooled shifted syngas and a second aqueous condensate, wherein the second aqueous condensate comprises cyanide in an amount of less than about 1 ppmw; (g) contacting at least a portion of the cooled shifted syngas with at least a portion of the cooled unshifted syngas to produce modified syngas, wherein a molar ratio of hydrogen to carbon monoxide in the modified syngas is lower than the molar ratio of hydrogen to carbon monoxide in the shifted syngas, wherein the unshifted syngas is characterized by a molar ratio of hydrogen to carbon monoxide of from about 0.5:1 to about 1.25:1, and wherein the modified syngas is characterized by a molar ratio of hydrogen to carbon monoxide of from about 1.7:1 to about 3.2:1; (h) introducing at least a portion of the second aqueous condensate to a sour water stripper to produce an acid gas and stripped water, wherein the acid gas comprises hydrogen sulfide, carbon dioxide, and ammonia, and wherein the sour water stripper and associated piping and equipment are fabricated from materials comprising carbon steel; (i) communicating a pump-around stream from the sour water stripper to a third cooling unit to produce a cooled pump-around stream, wherein at least a portion of the cooled pump-around stream is recycled to the sour water stripper, wherein the cooled pump-around stream comprises cyanide in an amount of less than about 20 ppmw, wherein the cooled pump-around stream is characterized by a pH of from about 7.5 to about 11, and wherein the third cooling unit and associated piping and equipment are fabricated from materials comprising carbon steel; and (j) introducing at least a portion of the acid gas to a sulfur recovery unit to produce sulfur.

A twenty-sixth embodiment, which is the method of the twenty-fifth embodiment excluding contacting at least a portion of the first aqueous condensate with at least a portion of the second aqueous condensate.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of producing synthesis gas (syngas) comprising:
   (a) receiving raw syngas from a gasification unit, wherein the raw syngas comprises cyanide;
   (b) introducing at least a portion of the raw syngas and water to a syngas scrubber to produce unshifted syngas;
   (c) introducing a first portion of the unshifted syngas to a first cooling unit to produce a cooled unshifted syngas and a first aqueous condensate, wherein the first aqueous condensate comprises cyanide in an amount of from about 5 parts per million by weight (ppmw) to about 200 ppmw;
   (d) recycling at least a portion of the first aqueous condensate to the syngas scrubber;
   (e) introducing a second portion of the unshifted syngas to a water gas shift unit to produce a shifted syngas, wherein a molar ratio of hydrogen to carbon monoxide in the shifted syngas is greater than a molar ratio of hydrogen to carbon monoxide in the unshifted syngas, wherein the second portion of the unshifted syngas comprises cyanide, and wherein at least a portion of the cyanide in the second portion of the unshifted syngas is converted to ammonia in the water gas shift unit;
   (f) introducing at least a portion of the shifted syngas to a second cooling unit to produce a cooled shifted syngas and a second aqueous condensate, wherein the second aqueous condensate comprises cyanide in an amount of less than about 2.5 ppmw;
   (g) contacting at least a portion of the cooled shifted syngas with at least a portion of the cooled unshifted syngas to produce a modified syngas, wherein a molar ratio of hydrogen to carbon monoxide in the modified syngas is greater than a molar ratio of hydrogen to carbon monoxide in the unshifted syngas, and wherein the molar ratio of hydrogen to carbon monoxide in the modified syngas is lower than a molar ratio of hydrogen to carbon monoxide in the shifted syngas; and
   (h) introducing at least a portion of the second aqueous condensate to a sour water stripper to produce an acid gas and stripped water, wherein the acid gas comprises hydrogen sulfide, carbon dioxide, and ammonia.

2. The method of claim 1, wherein none of the first aqueous condensate is introduced to the sour water stripper.

3. The method of claim 1, wherein the stripped water comprises cyanide in an amount of less than about 2 ppmw.

4. The method of claim 1, wherein the stripped water is recycled as process water.

5. The method of claim 1, wherein a pump-around stream is communicated from the sour water stripper to a third cooling unit to produce a cooled pump-around stream, wherein at least a portion of the cooled pump-around stream is recycled to the sour water stripper.

6. The method of claim 5, wherein the cooled pump-around stream comprises water and ammonia.

7. The method of claim 5, wherein the cooled pump-around stream is characterized by a pH of from about 7.5 to about 11.

8. The method of claim 5, wherein the cooled pump-around stream comprises cyanide in an amount of less than about 20 ppmw.

9. The method of claim 5, wherein a slip stream comprising a portion of the cooled pump-around stream is contacted with an acidic aqueous stream to increase the pH of the acidic aqueous stream, wherein the acidic aqueous stream has a pH lower than a pH of the cooled pump-around stream.

10. The method of claim 9, wherein the slip stream is from about 0 vol. % to about 5 vol. % of the cooled pump-around stream.

11. The method of claim 1, wherein the water gas shift unit comprises a sour shift catalyst comprising cobalt, molybdenum, copper, iron, cobalt-molybdenum catalyst, a chromium promoted iron-based catalyst, a copper promoted iron-based catalyst, a copper-zinc-aluminum catalyst, copper oxide (CuO), iron oxide ($Fe_2O_3$), oxides thereof, or combinations thereof.

12. The method of claim 1, wherein the sour water stripper, a third cooling unit, and associated piping and equipment are fabricated from materials comprising carbon steel.

13. The method of claim 1, wherein the sour water stripper, a third cooling unit, and associated piping and equipment are fabricated from materials excluding nickel-chromium-molybdenum-tungsten alloys, titanium-steel alloys, or combinations thereof.

14. The method of claim 1, wherein a molar ratio of hydrogen to carbon monoxide in the raw syngas is about the same as the molar ratio of hydrogen to carbon monoxide in the unshifted syngas.

15. The method of claim 1, wherein the raw syngas comprises cyanide in an amount of from about 5 ppmv to about 15 ppmv.

16. The method of claim 1, wherein the unshifted syngas comprises cyanide in an amount of less than about 15 ppmv.

17. The method of claim 1, wherein the shifted syngas comprises cyanide in an amount of less than about 1 ppmv.

18. The method of claim 1, wherein the raw syngas is produced by gasification of a carbon containing fuel in the gasification unit, wherein the carbon containing fuel comprises nitrogen in an amount of equal to or greater than about 0.5 wt. %.

19. The method of claim 18, wherein the carbon containing fuel comprises coal, coke, petroleum coke, biomass, or combinations thereof.

20. The method of claim 1, wherein the modified syngas is used for the production of methanol, substitute natural gas, liquid hydrocarbons, or combinations thereof.

21. The method of claim 1, wherein the modified syngas is characterized by a molar ratio of hydrogen to carbon monoxide of from about 1.7:1 to about 3.2:1.

22. The method of claim 1, wherein the unshifted syngas is characterized by a molar ratio of hydrogen to carbon monoxide of from about 0.5:1 to about 1.25:1.

23. The method of claim 1, further comprising introducing at least a portion of the acid gas to a sulfur recovery unit to produce sulfur.

24. A method of producing synthesis gas (syngas) comprising:
    (a) converting a carbon containing fuel to raw syngas in a gasification unit, wherein the carbon containing fuel comprises nitrogen in an amount of equal to or greater than about 0.5 wt. %, and wherein the raw syngas comprises carbon monoxide, hydrogen, cyanide, and solid particulates;
    (b) introducing at least a portion of the raw syngas and water to a syngas scrubber to remove at least a portion of the solid particulates from the raw syngas to produce unshifted syngas, and wherein a molar ratio of hydrogen to carbon monoxide in the raw syngas is about the same as a molar ratio of hydrogen to carbon monoxide in the unshifted syngas;
    (c) introducing a first portion of the unshifted syngas to a first cooling unit to produce a cooled unshifted syngas and a first aqueous condensate, wherein the first aqueous condensate comprises cyanide in an amount of from bout 20 ppmw to about 100 ppmw;
    (d) recycling at least a portion of the first aqueous condensate to the syngas scrubber;
    (e) introducing a second portion of the unshifted syngas to a water gas shift unit to produce a shifted syngas, wherein a molar ratio of hydrogen to carbon monoxide in the shifted syngas is greater than the molar ratio of hydrogen to carbon monoxide in the unshifted syngas, and wherein at least a portion of the cyanide in the second portion of the unshifted syngas is converted to ammonia in the water gas shift unit;
    (f) introducing at least a portion of the shifted syngas to a second cooling unit to produce a cooled shifted syngas and a second aqueous condensate, wherein the second aqueous condensate comprises cyanide in an amount of less than about 1 ppmw;
    (g) contacting at least a portion of the cooled shifted syngas with at least a portion of the cooled unshifted syngas to produce modified syngas, wherein a molar ratio of hydrogen to carbon monoxide in the modified syngas is lower than the molar ratio of hydrogen to carbon monoxide in the shifted syngas, wherein the unshifted syngas is characterized by a molar ratio of hydrogen to carbon monoxide of from about 0.5:1 to about 1.25:1, and wherein the modified syngas is characterized by a molar ratio of hydrogen to carbon monoxide of from about 1.7:1 to about 3.2:1;
    (h) introducing at least a portion of the second aqueous condensate to a sour water stripper to produce an acid gas and stripped water, wherein the acid gas comprises hydrogen sulfide, carbon dioxide, and ammonia, and wherein the sour water stripper and associated piping and equipment are fabricated from materials comprising carbon steel;
    (i) communicating a pump-around stream from the sour water stripper to a third cooling unit to produce a cooled pump-around stream, wherein at least a portion of the cooled pump-around stream is recycled to the sour water stripper, wherein the cooled pump-around stream comprises cyanide in an amount of less than about 20 ppmw, wherein the cooled pump-around stream is characterized by a pH of from about 7.5 to about 11, and wherein the third cooling unit and associated piping and equipment are fabricated from materials comprising carbon steel; and
    (j) introducing at least a portion of the acid gas to a sulfur recovery unit to produce sulfur.

25. The method of claim 24, excluding contacting at least a portion of the first aqueous condensate with at least a portion of the second aqueous condensate.

* * * * *

UNITED STATES PATENT AND TRADEMARK OFFICE
CERTIFICATE OF CORRECTION

PATENT NO. : 9,856,141 B2  Page 1 of 1
APPLICATION NO. : 14/990646
DATED : January 2, 2018
INVENTOR(S) : Ravi Ravikumar, Patrick Goodman and Sanjiv Dabee It is certified that error appears in the above-identified patent and that said Letters Patent is hereby corrected as shown below:

In the Drawings

Drawing sheet 1/1:
Insert --FIGURE. 1--

In the Claims

Column 24, Line 5:
"bout" should be "about"

Signed and Sealed this
Twenty-second Day of May, 2018

Andrei Iancu
*Director of the United States Patent and Trademark Office*